United States Patent [19]
Katoh et al.

[11] Patent Number: 5,561,535
[45] Date of Patent: Oct. 1, 1996

[54] IMAGE FORMING APPARATUS AND METHOD WHICH DETERMINES INFORMATION TO BE PRINTED BASED ON THE PUNCH HOLES OF A RECORDING SHEET

[75] Inventors: Kazuhiko Katoh, Kawasaki; Masakuni Kutsuwada, Musashino; Haruhiko Kihara; Masahiro Kitayama, both of Kawasaki; Minoru Saitoh, Yokohama, all of Japan

[73] Assignee: Ricoh Company, Limited, Tokyo, Japan

[21] Appl. No.: 297,050

[22] Filed: Aug. 26, 1994

[30] Foreign Application Priority Data

Aug. 27, 1993 [JP] Japan .................................. 5-235544
Aug. 17, 1994 [JP] Japan .................................. 6-193388

[51] Int. Cl.⁶ ............................ H04N 1/40; G03G 21/00; G03G 15/04
[52] U.S. Cl. ........................ 358/448; 355/218; 355/244; 355/324
[58] Field of Search .................. 355/218, 244, 355/218, 324; 358/448

[56] References Cited

U.S. PATENT DOCUMENTS 5,172,167 12/1992 Ho ........................................ 355/218

Primary Examiner—Edward L. Coles, Sr.
Assistant Examiner—Kevin L. Chapple
Attorney, Agent, or Firm—Oblon, Spivak, McClelland, Maier & Neustadt, P.C.

[57] ABSTRACT

An image forming apparatus into which additional information and the write area are inputted when reading a document image and which synthesizes the additional information as well as the document image read and prints the data on write area inputted, and especially that which prints the additional information in an area between punch holes for filing.

10 Claims, 14 Drawing Sheets

(mm)

(mm)

TWO-PUNCH-HOLE FORMAT

FOUR-PUNCH-HOLE FORMAT

IMAGE FORMING APPARATUS AND METHOD WHICH DETERMINES INFORMATION TO BE PRINTED BASED ON THE PUNCH HOLES OF A RECORDING SHEET

FIELD OF THE INVENTION

The present invention relates to an image forming apparatus such as a digital copying machine, and more particularly to an image forming apparatus into which additional information and the write area are inputted when reading a document image and which synthesizes the additional information as well as the document image read and prints the data on write area inputted, and especially that which prints the additional information in an area between punch holes for filing.

BACKGROUND OF THE INVENTION

In the conventional type of image forming apparatus, a document set on contact glass is read by a scanner, and is restored as an image by an image forming means on recording paper. Especially, when additional information is added, after an image is formed once, onto the recording paper, the additional information is manually written.

Also when printing on recording paper with punch holes for filing (drill paper), or when drilling punch holes for filing on recording paper after an image is copied on the recording paper once, to prevent an area with an image copied thereon from being punched, a document image is removed to the inner side of recording paper in relation to positions where punch holes have been provided, or to positions where punch holes are to be provided, and then copying process is carried out.

However, in the conventional type of image forming apparatus as described above, when information other than a document image is written, the information must be written manually. For this reason, especially when a large number of copies must be prepared, the work to manually write the additional information is very troublesome, which disadvantageously lowers the work efficiency. Also as the additional information is manually written, appearance of the copies is disadvantageously deteriorated.

Furthermore, when recording paper with punch holes for filing is arranged thereon, or when punch holes are punched after an image is copied once, generally the image is formed evading an area with punch holes therein, so that spaces between punch holes are not used effectively.

SUMMARY OF THE INVENTION

It is an object of the present invention to make it possible to simultaneously print a document image together with additional information and also to effectively utilize spaces between punch holes for insuring adaptiveness for filing and a good appearance of the recording paper.

The image forming apparatus according to the present invention reads data on a document as an image signal with a document reading means, writes an optical signal corresponding to the image signal read by an optically writing means onto a photo-sensitive unit, receives additional print information with a print information inputting means, stores a write area in which the input print information is to be written in with an area memory, and synthesizes the read document image with the input print information with an image synthesizing means to form a synthesized image in the write area stored therein.

The image forming apparatus according to the present invention reads data on a document as an image signal with a document reading means, writes an optical signal corresponding to the image signal read by an optically writing means onto a photo-sensitive unit, receives additional print information with a print information inputting means, stores the input print information with a print information memory, stores a write area in which the input print information is to be written in with an area memory, and synthesizes the read document image with the stored print information with an image synthesizing means to synthesize an image in the write area stored therein.

The image forming apparatus according to the present invention reads data on a document as an image signal with a document reading means, writes an optical signal according to the image signal read by an optically writing means onto a photo-sensitive unit, receives additional print information with a print information inputting means , specifies a write area in which the input print information is to be written in with an area specifying means, and synthesizes the read document image with the input print information with an image synthesizing means to synthesize an image in the specified write area.

The image forming apparatus according to the present invention reads data on a document as an image signal with a document reading means, writes an optical signal corresponding to the read image signal onto a photo-sensitive unit with an optically writing means, specifies a type of recording paper with a recording paper specifying means, receives additional print information with a print information inputting means, stores a plurality of types of write area on the recording paper in which the input print information is to be written in with an area memory, selects a type of write area according to an input signal from the recording paper specifying means with an area selecting means, and synthesizes the read document image with the input information withan image synthesizing means to synthesize an image in the selected write area.

The image forming apparatus according to the present invention reads data on a document as an image signal with a document reading means, writes an optical signal corresponding to the read image signal onto a photo-sensitive unit with an optically writing means, specifies a number of punch holes for filing with a punch hole specifying means, receives additional print information with a print information inputting means, stores a plurality of types of write area on recording paper in which the input print information is to be written in with an area memory, selects a write area according to an input signal from the punch hole specifying means with an area selecting means, and synthesizes the read document image with the selected write area with an image synthesizing means to synthesize an image in the selected write area.

The image forming apparatus according to the present invention sets up a write area in a space between punch holes.

Other objects and features of this invention will become understood from the following description with reference to the accompanying drawings.

DESCRIPTION OF THE PREFERRED EMBODIMENTS

Figure 1:
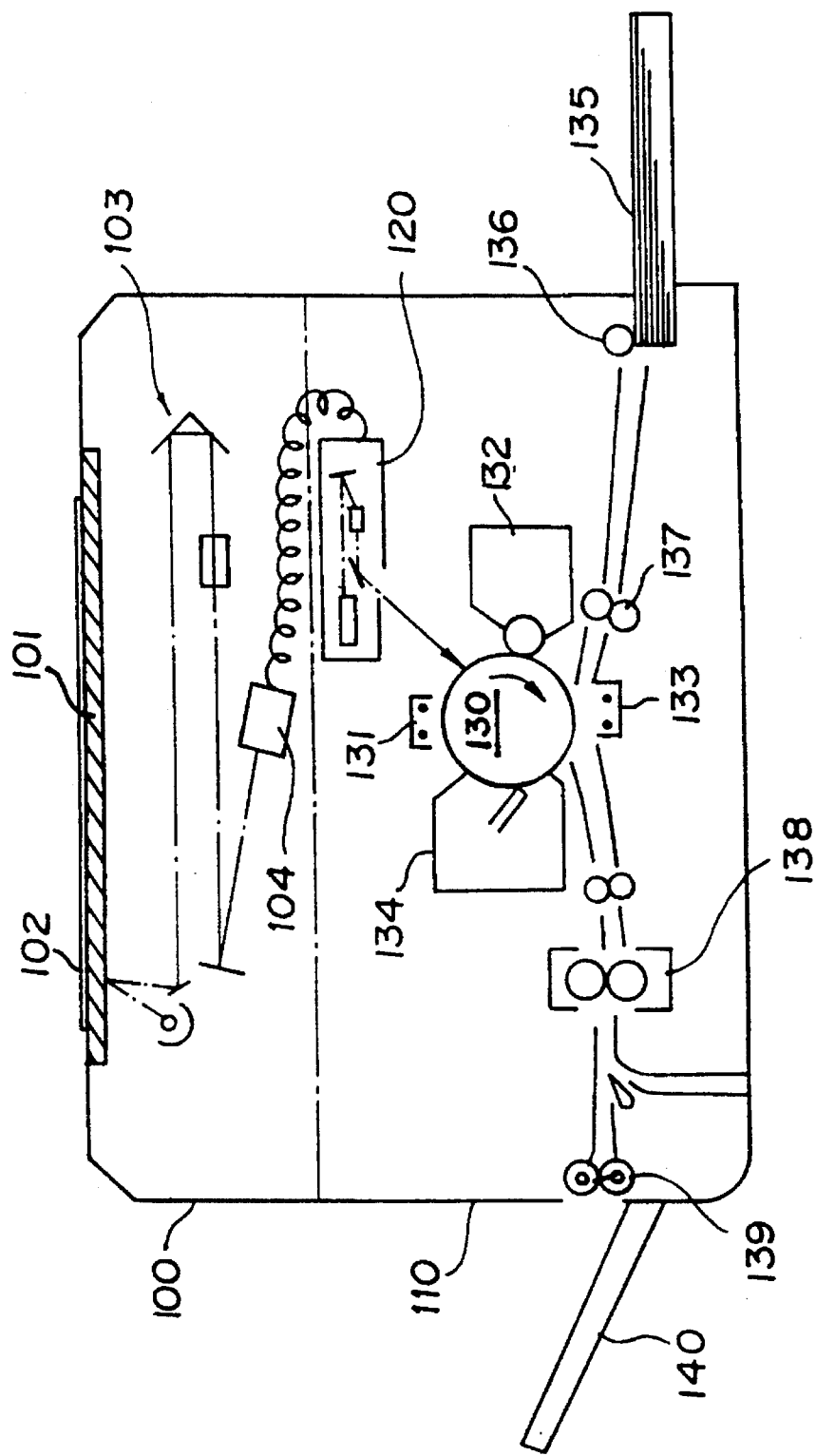
FIG. 1 is an explanatory view for illustrating general configuration of an image forming apparatus in which the present invention is applied.

Detailed description is made for embodiments of the present invention with reference to the related drawings. FIG. 1 is an explanatory view for illustrating general configuration of an image forming apparatus in which the present invention is applied. This apparatus comprises an image forming system 110 with a general laser writing means applied therein and an image reading unit (called image scanner hereinafter) 100 both of them monolithically synthesized with each other, and the image scanner 100 is connected to the top of the image forming apparatus 110.

In FIG. 1, the image scanner 100 is constructed as described below. Namely in this figure, designated at the reference numeral 101 is a contact glass on which a document 102 is placed, at 103 an exposing/illuminating unit comprising an exposure lamp, a mirror, and lenses which irradiates light onto the document 102 on the contact glass 101, obtains and guides reflected light corresponding to an image of the document 102 to form an image on a read sensor. The reference numeral 104 indicates a read sensor 104 using a CCD image sensor therein.

The image forming system 110 comprises a laser write system, an image forming system, and a paper feed system as described below. In this apparatus, the laser write system is accommodated in a laser write unit indicated by the reference numeral 120. The laser write unit 120 has a laser output unit (not shown herein), and inside the laser output unit is provided a polygon mirror which rotates at a constant and high speed being driven by a laser diode and a motor. Laser beam outputted from this laser write unit 120 is irradiated via the polygon mirror and a mirror or the like onto a photo-sensitive drum 130 provided in the image forming system.

The image forming system is constructed as described below. Namely around the photo-sensitive drum 130 are disposed system components including an electrifying charger 131 which homogeneously electrifies a surface of the photo-sensitive drum 130, a development unit 132 which visualizes an electrostatic latent image formed on the surface of the photo-sensitive drum 130, a transfer charger 133 which transfers a toner image formed on the surface of the photo-sensitive drum 130 onto recording paper fed thereto, and a cleaning unit 134 which cleans the surface of the photo-sensitive drum 130 after the transfer process above. It should be noted that a beam sensor (not shown) which generates a main scan sync. signal is at a position adjacent one end of the photo-sensitive drum 130 where the laser beam is irradiated.

The paper feed system is constructed as described below. Namely in this figure, designated at the reference numeral 135 a paper feed cassette on which recording paper is mounted, at 136 a paper feed roller which feeds recording paper from the paper feed cassette 135, at 137 a resist roller which transfers the recording paper to a transfer section at a specified timing, at 138 a fixing unit which fixes an image on recording paper transferred thereto, at 139 a paper discharge roller, and at 140 a paper discharge tray.

With the configuration as described above, next description is made for basic operations of the image scanner 100. The document 102 set at a specified position on the contact glass 101 is exposed to and receives light from the exposing/illuminating unit 103, and the image is imported as reflected light corresponding to the image on the read sensor 104. As a result, the document image is read line by line by the read sensor 104.

Next description is made for operations of the image forming system 110. The entire surface of the photo-sensitive drum 130 is homogeneously electrified at a high electric potential by the electrifying charger 131. When laser beam is irradiated to the surface of the photo-sensitive drum 130, electric potential in the irradiation section drops. ON/OFF of the laser beam is controlled according to black/white of each record element, so electric potential distribution corresponding to record elements, namely an electric latent image is formed on the surface of the photo-sensitive drum 130.

When the section with the electric latent image formed thereon passes through the development unit 132, toner adheres to the section according to an electric potential at each record element, thus the electric latent image is visualized to form the toner image. Recording paper is fed at a specified timing by the resist roller 137 to the section where the toner image has been formed, and is overlaid on the toner image. After this toner image is transferred by the transfer charger 133 to the recording paper, the recording paper is separated from the photo-sensitive unit 130.

The recording paper separated from the photo-sensitive drum 130 as described above is transferred via a transfer path, subjected to a fixing process by the fixing unit 138 comprising a heat roller with a heater incorporated therein and a pressure roller, and then discharged to the paper discharge tray 140 by the paper discharge roller 139. After the transfer process is finished, the surface of the photo-sensitive drum 130 is cleaned by the cleaning unit 134 to prepare for the next cycle of copying process.

On the other hand, recording paper accommodated in the paper feed cassette is fed by the paper feed roller 136. The fed recording paper once stops in a state where the recording paper contacts the resist roller 137, is subjected to skew (inclined transfer) correction, and then transferred to a transfer section of the photo-sensitive drum 130 at a timing synchronized to progress of the recording process.

FIG. 2 to FIG. 5 are explanatory views for illustrating panel configuration of the operating panel of the image forming apparatus according to the present invention and display states thereon respectively. As the operating panel 200, a liquid crystal display based on a touch panel system generally used is used, and as shown in this figure, the alphabetic and numerical input/display mode (Refer to FIG. 2), Kana input/display mode (Refer to FIG. 3), Katakana input/display mode (Refer to FIG. 4), and punch hole selection/display mode (Refer to FIG. 5) are available.

Figure 5:
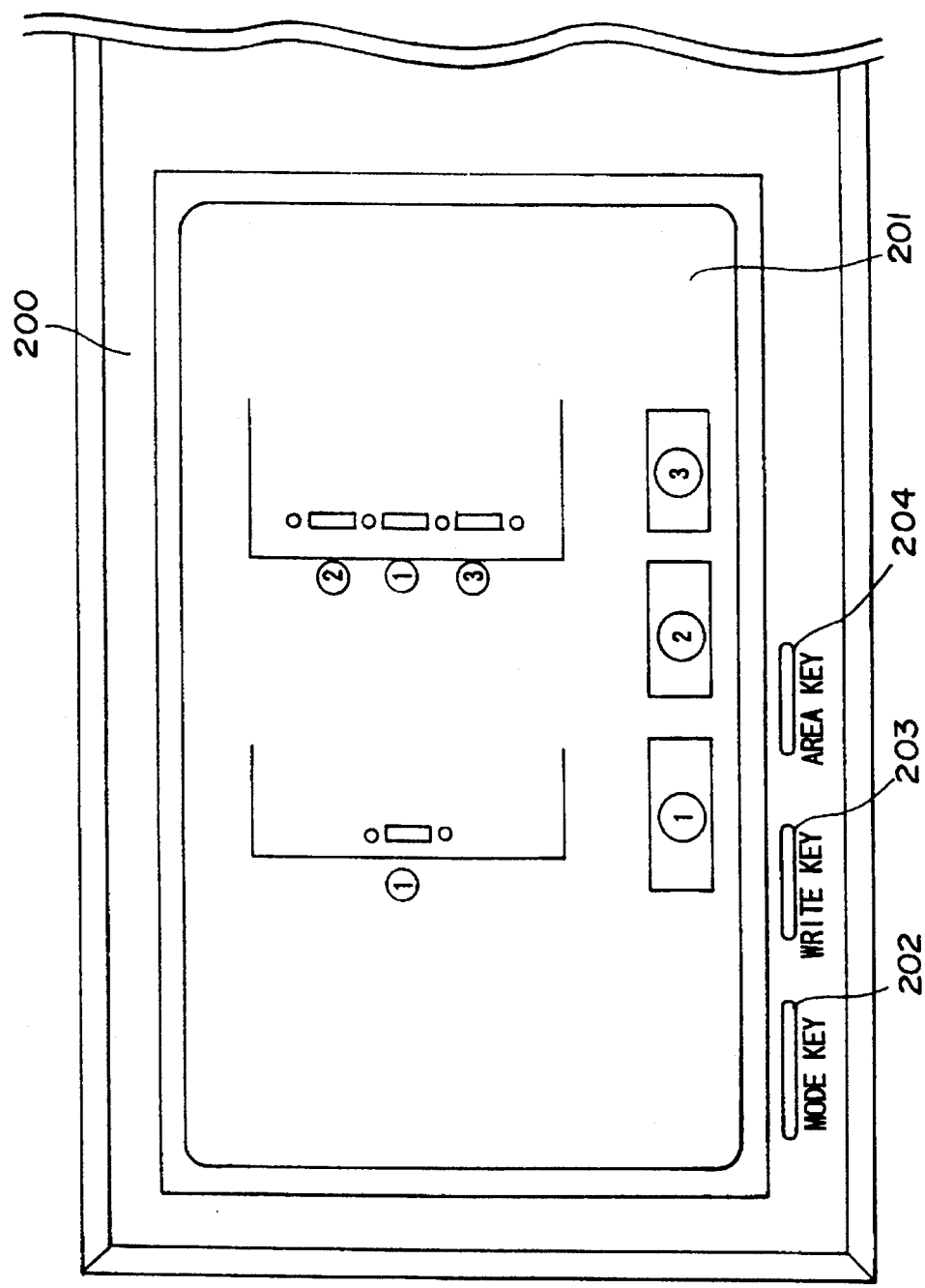
FIG. 5 is an explanatory view for illustrating a panel configuration of an operating panel having a punch hole display state.

In the figures, designated at the reference numeral 201 is a panel display screen allowing touch input, at 202 input mode key used to specify each of the alphabetical and numerical, Kana, and Katakana input/display mode, at 203 a write key used to input specified items (additional information), at 204 an area key used for switching to the punch hole selection/display mode (Refer to FIG. 5). Next description is made for operations of the operating panel 200.

(1) When inputting a specified item to be printed (additional information)

Figure 2:
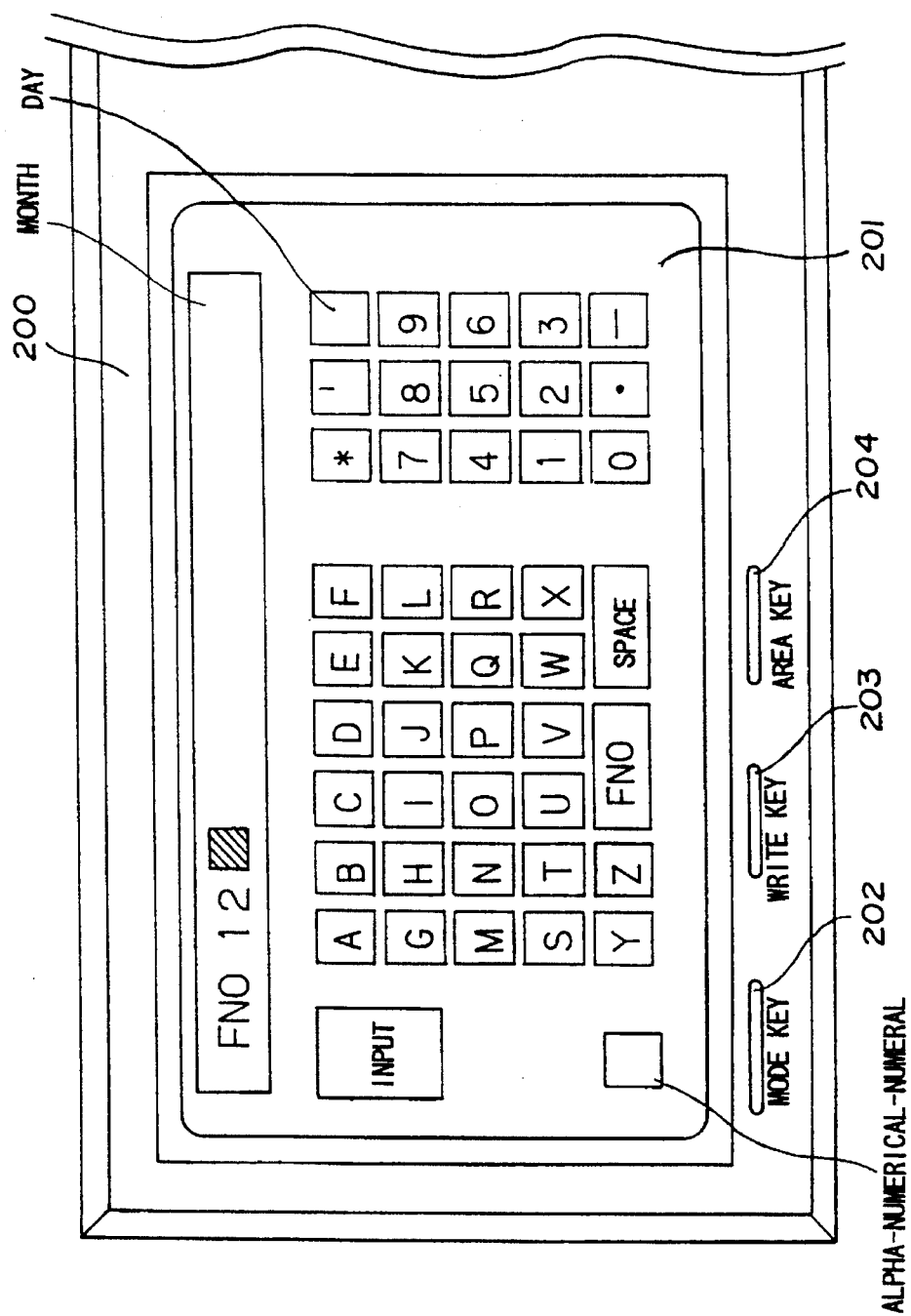
FIG. 2 is an explanatory view for illustrating panel configuration of an operating panel having an alphabetical as well as numerical display state according to the present invention.
Figure 3:
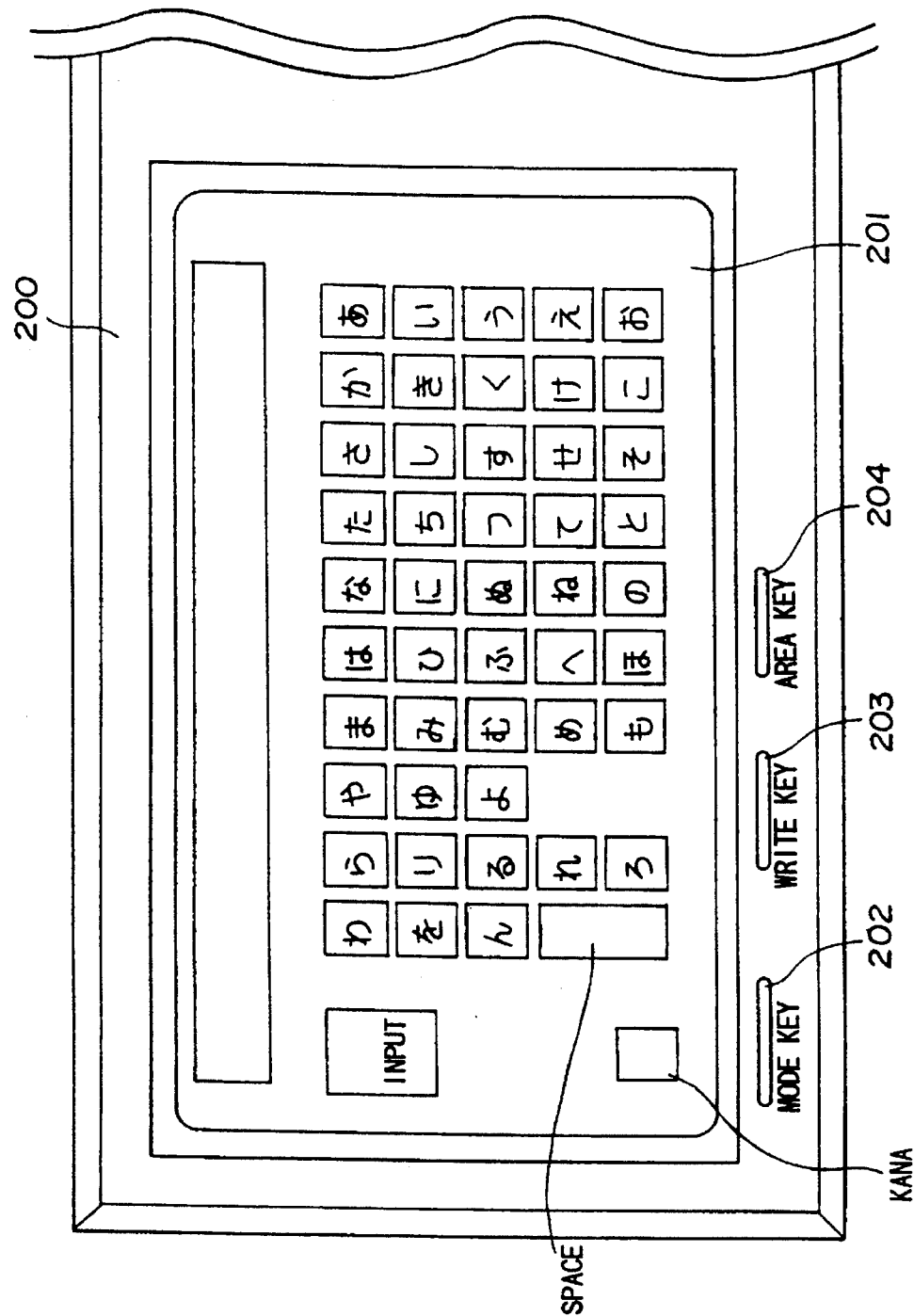
FIG. 3 is an explanatory view for illustrating a panel configuration of an operating panel having a kana (a type of Japanese characters) display state according to the present invention.
Figure 4:
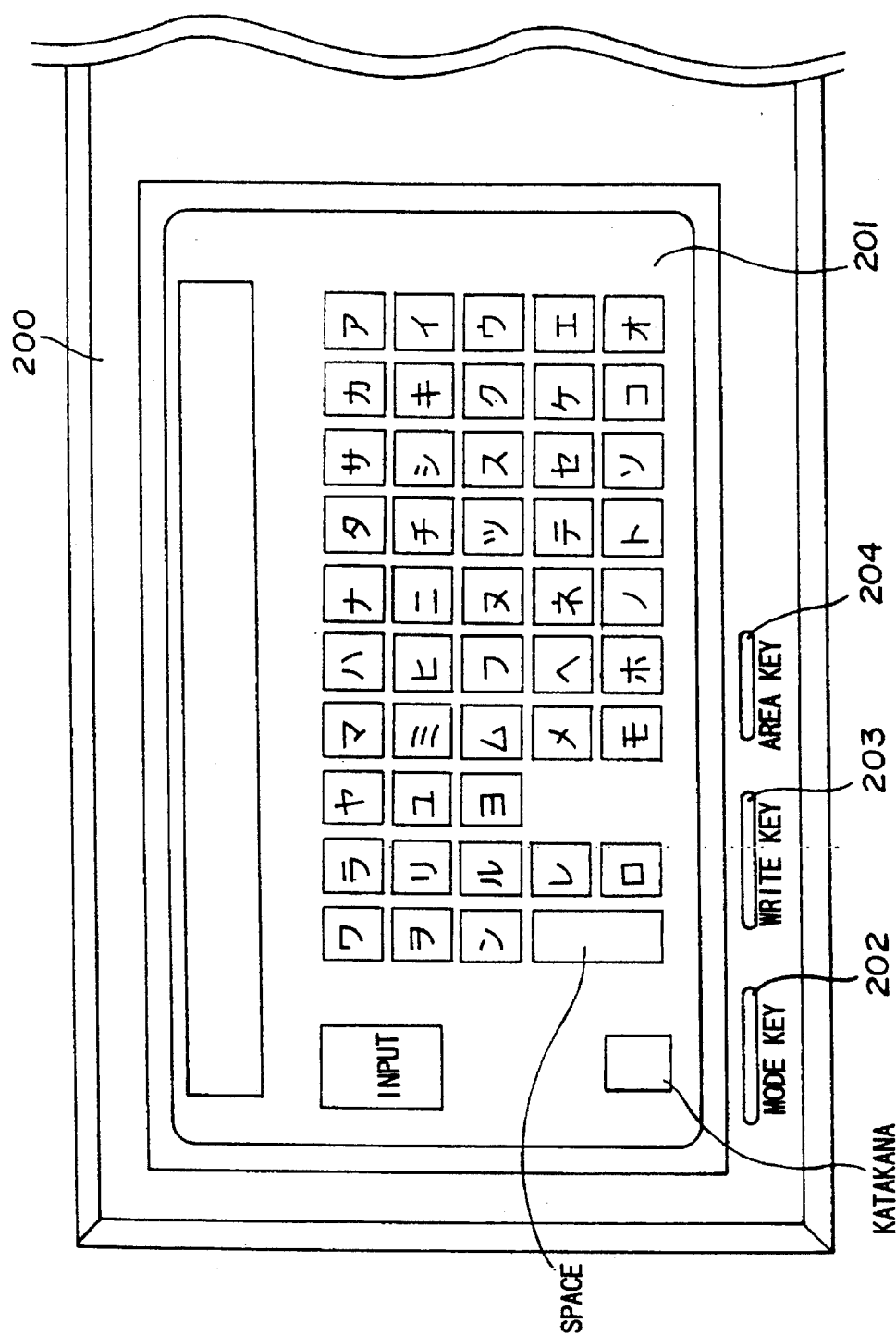
FIG. 4 is an explanatory view for illustrating a panel configuration having a katakana (another type of Japanese characters) display state according to the present invention.

When an operator presses down the write key 203, display on the panel display screen 201 is switched to the alpha-numerical input/display mode, as shown in FIG. 2. Then, when the input mode key 202 is pressed down repeatedly, the input/display mode is sequentially switched from the alpha-numerical-numeral (Refer to FIG. 2) to Kana (Refer to FIG. 3) and to Katakana (Refer to FIG. 4).

For instance, if an operator hopes to record the item of "FNO12" on recording paper, the operator set up the alpha-numerical input/display mode by pressing down the input mode key 202, and after the panel display screen 201 is switched to that shown in FIG. 2, the operator inputs "FNO12" by pressing down the keys of "F", "N", "O", "1", "2" and "Input" in this order.

Also in this embodiment, as shown in FIG. 2, special keys of "Month", "Day" and "FNO", which are frequently used, are provided on the panel display screen 201 in the alpha-numerical input/display mode, so that an operator can operate the system easily. For this reason, when an operator hopes to record the item of "FNO12" as described above, the operator can input the data by pressing the keys of "FNO", "1", "2", and "Input".

Figure 12:
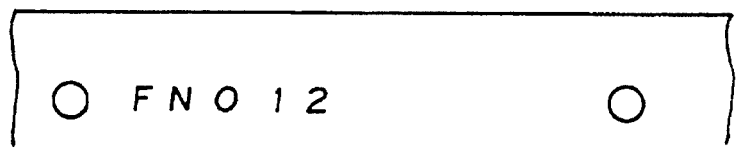
FIG. 12 is an explanatory view for illustrating an example of print output according to the present invention.

It should be noted that an example of print output with the operation described above is shown in FIG. 12. As shown in this figure, "FNO12" is printed in a space between punch holes on the recording paper.

(2) When specifying an area for a specified item (additional information) to be printed in.

Figure 6:
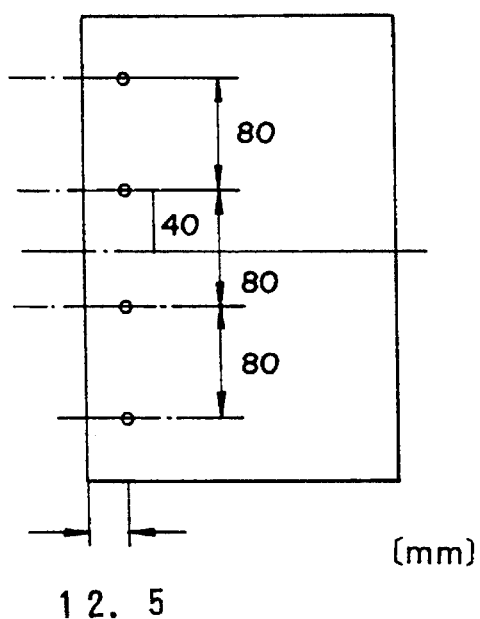
FIG. 6 is an explanatory view for illustrating forms of and positional relation between four punch holes according to the present invention.
Figure 7:
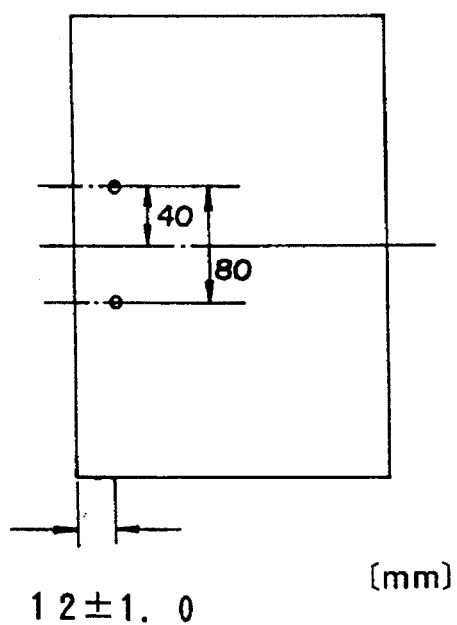
FIG. 7 is an explanatory view for illustrating forms of and positional relation between two punch holes according to the present invention.

FIG. 6 and FIG. 7 are explanatory views for illustrating a format of punch holes and the positional relation between them, and 4-punch-hole format and 2-punch-hole format are shown in FIG. 6 and FIG. 7 respectively. There are ISO specifications or the like concerning the punch hole format, positional relations between them, and size thereof. For this reason, an area in which a specified item is to be printed is previously specified in relation to the positions of punch holes.

In this embodiment, an operator can freely select an area from 3 areas previously specified. The three areas are as follows:

① An area for 2-punch-hole format which is provided between two punch holes,

② An area for 4-punch-hole area which is provided between the top hole and the second one from the top in FIG. 6.

③ An area for 4-punch-hole format which is provided between the third hole from the top and the bottom hole in FIG. 6.

Next description is made for operations to select an area. When the area key 204 is pressed down, the panel display screen 201 is switched to the punch hole selection/display mode screen as shown in FIG. 5. Namely a layout with the "①", "②" and "③" above added therein for 2-punch-hole format and 4-punch-hole format and the number keys of "①", "②", and "③" are displayed on the screen. Then the operator can select and set up any of the areas by pressing any of the number keys of "①", "②", and "③". With this operation for selection of a number key, which area has been selected is stored as area data in the memory.

By the way, as for an area between the second hole and the third hole from the top in the 4-punch-hole format, it can be understood that the area is common to the 2-punch-hole format. It should be noted that it is possible to specify all of the three areas for the 4-punch-hole format one by one and to print specified items in each area. In addition to the way of previously setting up the areas like in this embodiment, the areas can be specified by specifying the coordinates or inputting numerical values.

Figure 8:
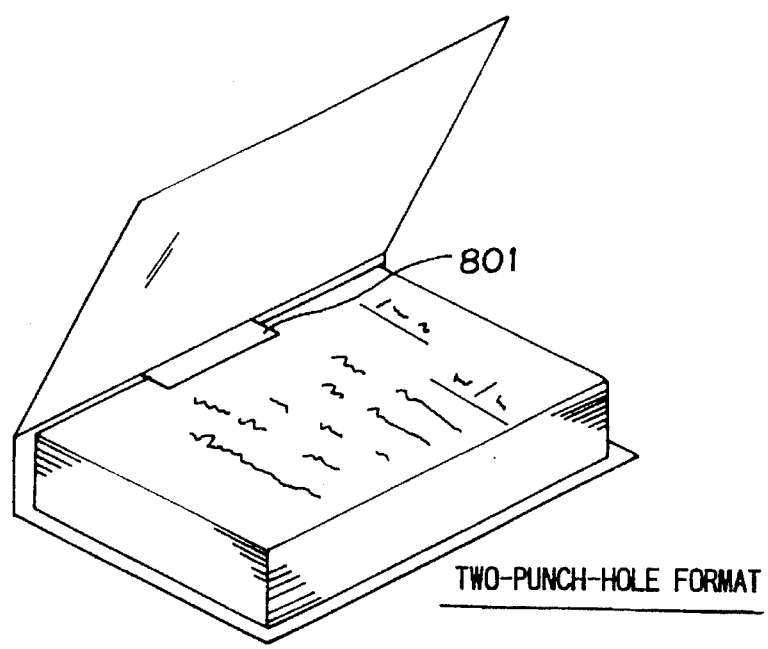
FIG. 8 is an explanatory view for illustrating a state (two-hole file) in which a plurality of sheets of recording paper are filed by making use of the punch holes according to the present invention.
Figure 9:
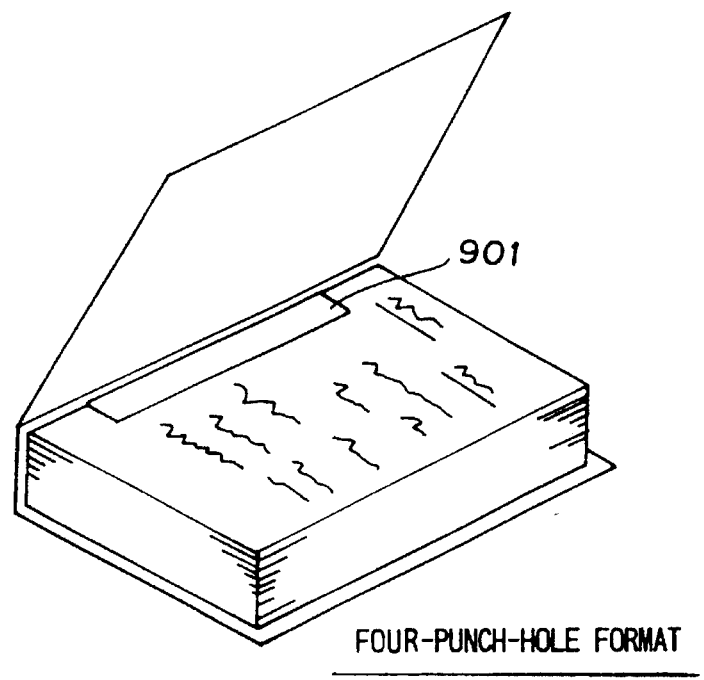
FIG. 9 is an explanatory view for illustrating a state (four-hole file) in which a plurality of sheets of recording paper are filed by making use of the punch holes according to the present invention.

Next description is made for the reason why the spaces between punch holes are set up as areas for printing. FIG. 8 and FIG. 9 are explanatory views for illustrating a state where a plurality of sheets of recording paper are filed by making use of the punch holes, and FIG. 8 shows the 2-punch-hole format, while FIG. 9 shows the 4-punch-hole format.

When filing a plurality of sheets of recording paper each provided punch-holes thereon and having some data copied thereon, generally the sections between punch holes can not been seen when filed with file binding tools 801 and 901 as shown in FIG. 8 and FIG. 9 respectively. Additional information to be added to a document image includes, for instance, year, month, and date when the copy is prepared, a file number (Classification) to be filed, and a date when the document should be abolished (or a filing period). The additional information as described above are not always required after filed once. In other words, these types of additional information are generally required only in a period from a time when the copy is prepared until the copy is filed, or when the copy is taken out from the file.

For instance, a file number for a binder in which each copy is bound is information required, when preparing a copied sheet of a document, to clarify a binder in which the copy is filed, and the information is not necessary after filed once in a binder. For this reason, this type of additional information as described above may not always been visible in a state when the copy is filed. On the contrary, if any additional information is located at a visible position, sometimes such a misunderstanding as that the additional information was included in the document image occurs. For this reason, also to clearly show that the additional information was added to the document image, it is preferable that the additional information is located at an invisible position in a filed state, and for this reason in this embodiment an area for a specified item (additional information) to be printed in are provided between punch holes for filing.

Also in case of 4-punch-hole format, the section common to that in the 2-punch-hole format is available, so that only one area for printing should be prepared. For this reason, by storing an area for printing in a memory, the area specifying means can be omitted.

Figure 10:
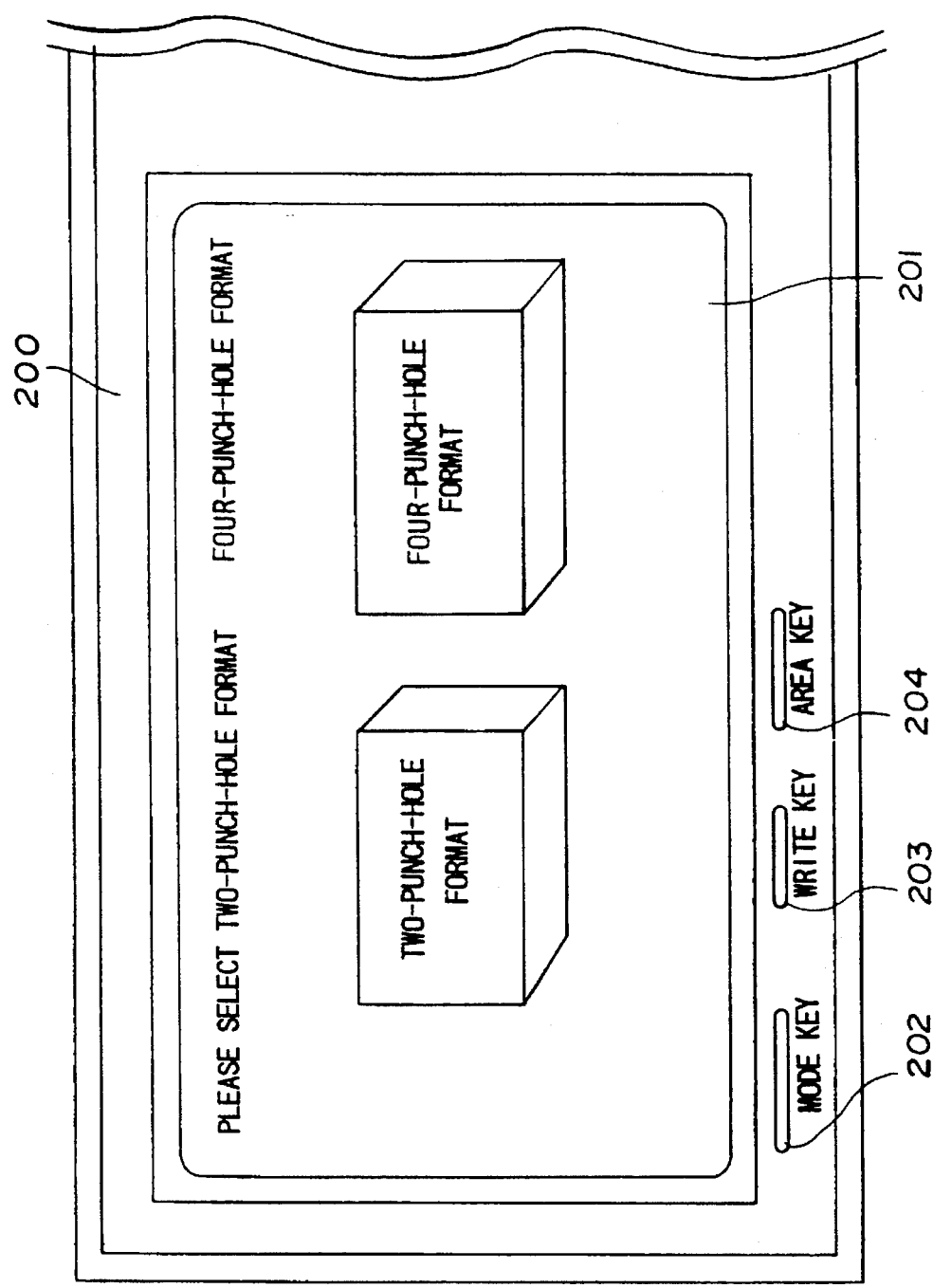
FIG. 10 is an explanatory view for illustrating an example of panel display screen for selecting a type of punch holes according to the present invention.
Figure 11:
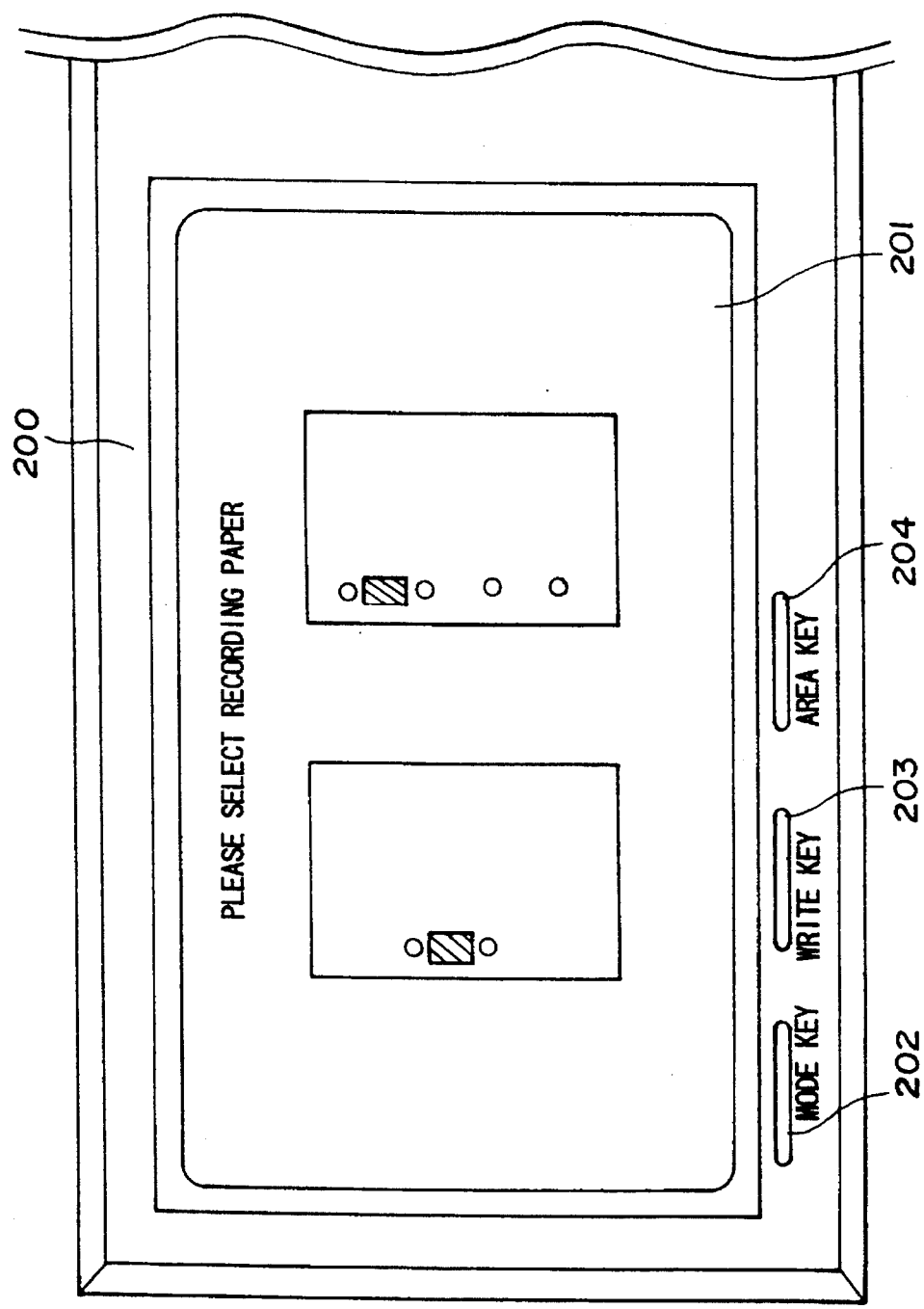
FIG. 11 is an explanatory view for illustrating an example of panel display screen for selecting a type of punch holes for recording paper according to the present invention.

Also when any of the 4 punch holes is fixed, for instance, in the top area, only one area for the 2-punch-hole format is required. For this reason, the area can easily be set up by specifying whether the recording paper is for the 2-punch-hole format or for the 4-punch-hole format, or by specifying whether a number of holes to be provided is 2 or 4. FIG. 10 and FIG. 11 are explanatory views for illustrating the panel display screens for selection of the punch holes above and for selection of punch holes according to a format of recording paper respectively. The panel display screen 201 is displayed when the area key 204 is pressed down, and selection of either the 2-punch-hole format or the 4-punch-hole format and specification of either 2-hole punching or 4-hole punching as well as of an area can be inputted by way of touch operation.

Figure 13:
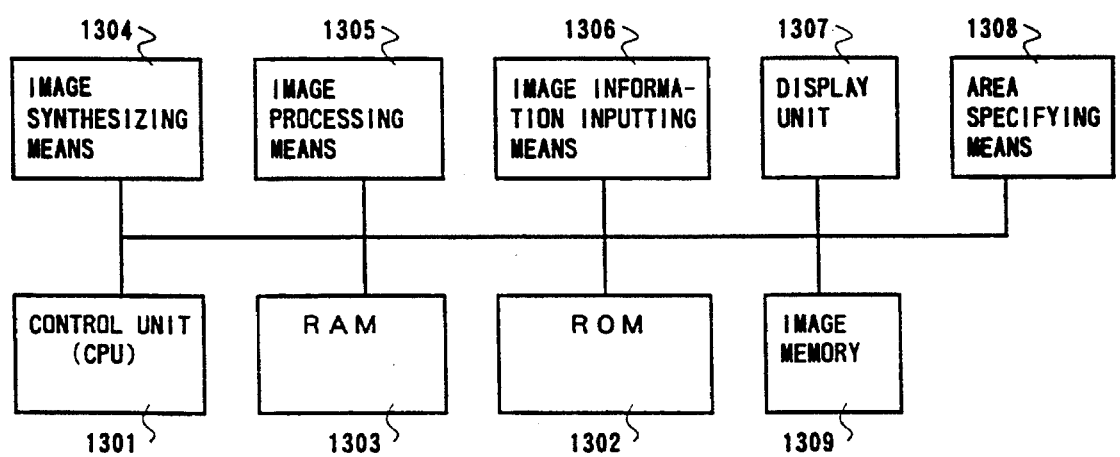
FIG. 13 is a block diagram illustrating the general configuration of a control system according to the present invention.

FIG. 13 is a block diagram illustrating general configuration of a control system for the image forming apparatus according to the present invention, and in this figure, designated the reference numeral 1301 is a CPU (Control unit) which executes specified control based on a control program, at 1302 a ROM in which the control program is stored, at 1303 a RAM in which a result of computing by the CPU 1301 or intermediate data is stored, or which is used as a work memory, at 1304 an image synthesizing means for synthesizing a document image data with print information, at 1305 an image processing means for executing various types of processing such as that for enlarging or reducing an image, at 1306 a print information inputting means for inputting additional print information, at 1307 a display unit for displaying information, a state of each area, guidance or the like, at 1308 an area specifying means for specifying an area for print information to be printed in, and at 1309 an image memory in which image data is stored temporally.

Figure 14:
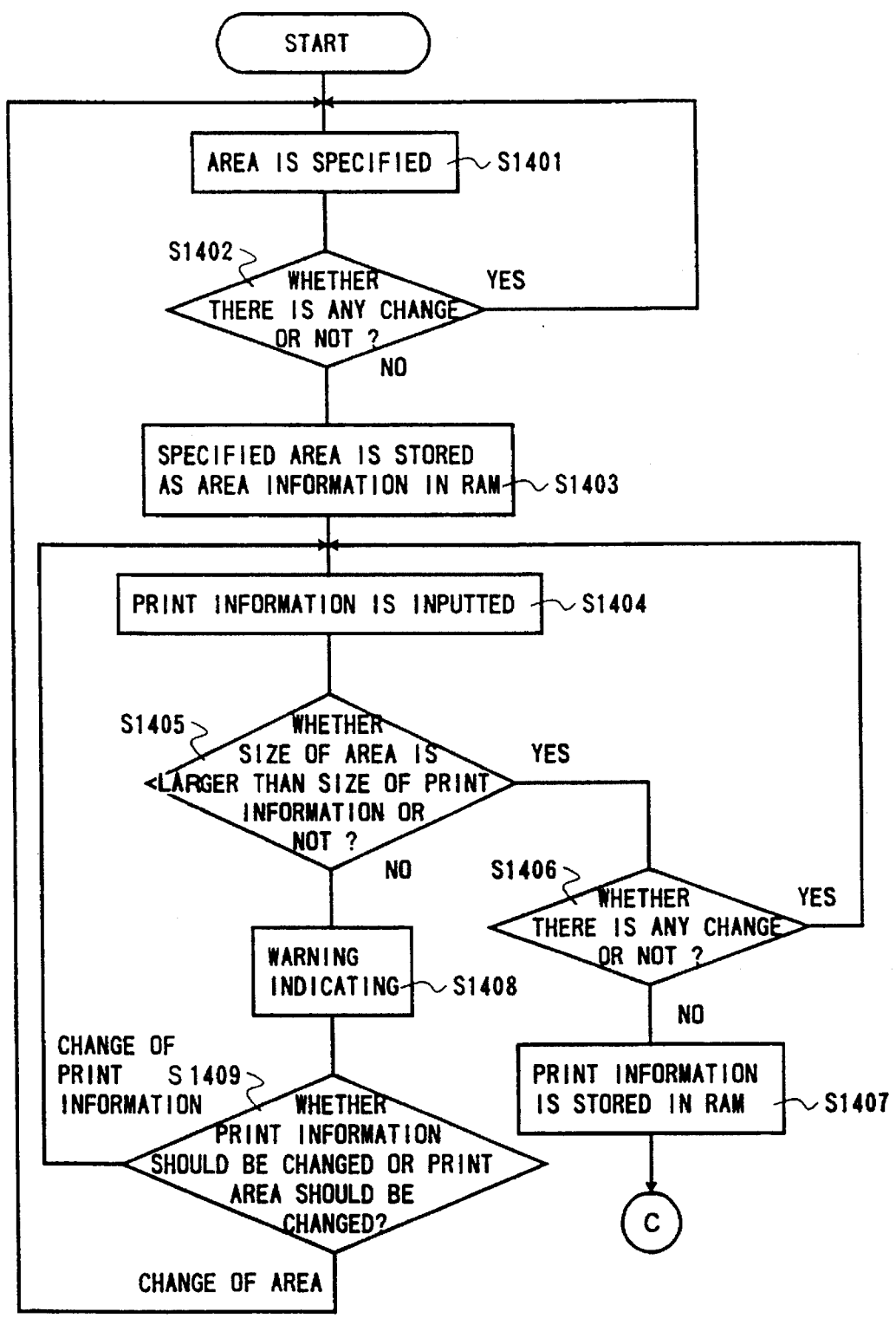
FIG. 14 is a flow chart illustrating areas and operations in Example 1 of print information processing according to the present invention.

FIG. 14 is a flow chart illustrating operations in Example 1 of print information processing. In this figure, when an area is specified according to the sequence as described above (S1401), and then a determination as to whether there is any change in the area specification or not is executed (S1402). If it is determined that there is a change in area specification in this step S1402, the system control returns to the first step S1401. On the contrary, if it is determined that there is no change in the area specification in step S1402 above, the specified area is stored as area information in the RAM 1303 (S1403). Then, when print information is inputted as described above (S1404), the input area information is compared to a size of input print information. Namely whether a size of area is larger than the size of print information or not is executed (S1405).

If it is determined in step S1405 above that the area size is larger than the size of print information, furthermore a determination as to whether there is any change in these input information or not is made (S1406), and if it is determined that there is no change, the input print information is stored in the RAM 1303 (S1407), and the system control shifts to the process c. On the contrary, if it is determined that there is any change in the input information in step S1406, the system control returns to the above step S1404, and the input information is changed and inputted again.

If it is determined in step S1405 above that the area is smaller than the size of input information (an area size<the size of input information), a warning indicating the necessity to change the input information is provided (S1408). Then, a determination whether the print information should be changed or the print area should be changed is executed (S1409). If it is determined in step S1409 above that the print information should be changed, the system control returns to step S1404 above, and the print information is changed and inputted again. On the contrary, if it is determined in step S1409 above that the print area should been changed, the system control returns to the first step S1401, and an area is specified again. It should be noted that change of the area size is executed when it can freely be changed by inputting coordinate values or numerical values.

Figure 15:
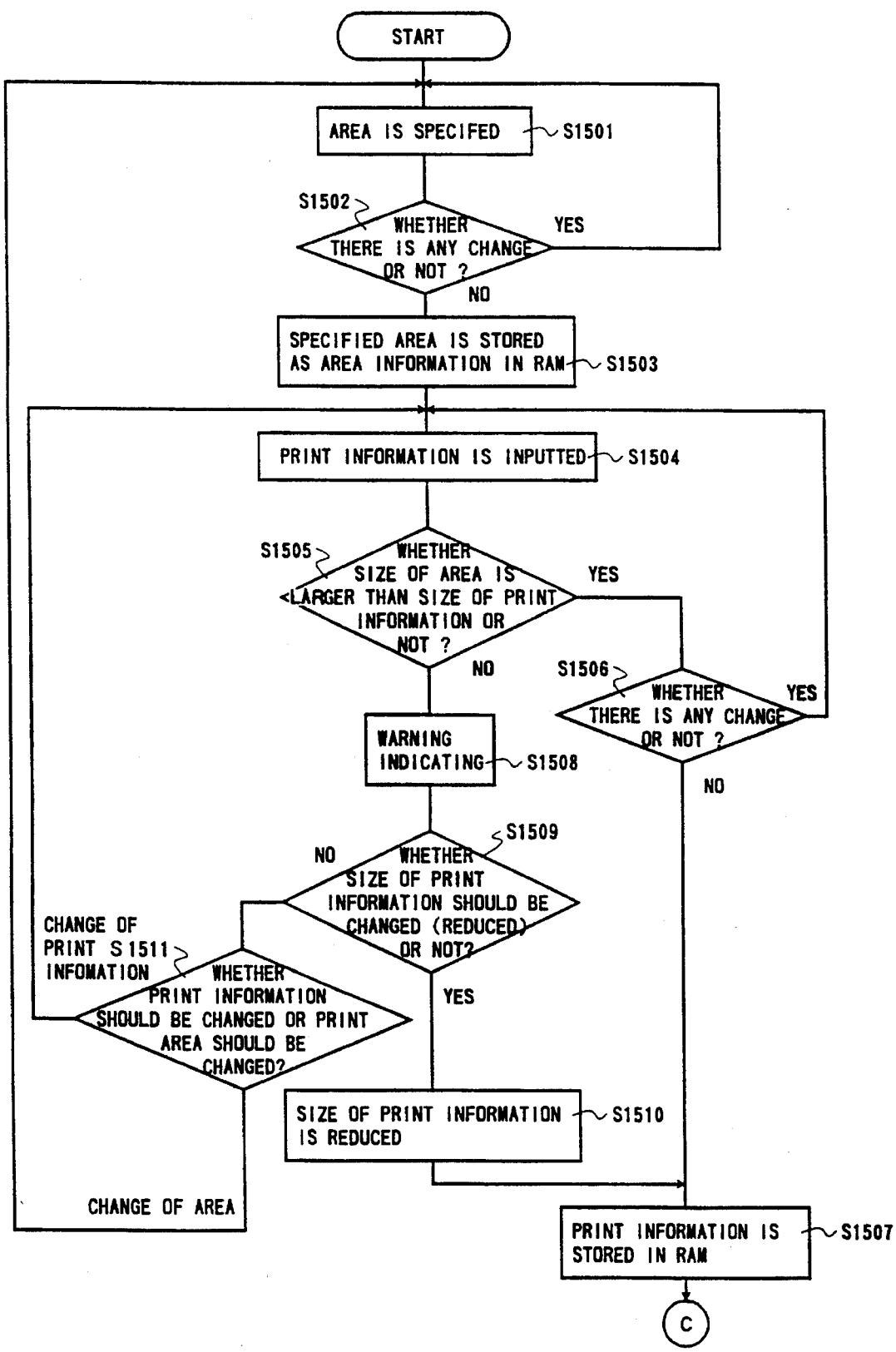
FIG. 15 is a flow chart illustrating areas and operations in Example 2 of print information processing according to the present invention.

FIG. 15 is a flow chart illustrating operations in Example 2 of print information processing. In this figure, when an area is specified according to the sequence described above (S1501), then a determination as to whether there is any change in the area specification or not is executed (S1502). If it is determined in step S1502 that there is any change in the area specification, the system control returns to step S1501. On the other hand, if it is determined in step S1502 above that there is no change in the area specification, the specified area is stored as area information in the RAM 1303 (S1503). Then, when the print information is inputted as described above (S1504), the size of input area information is compared to the size of input information. Namely a determination as to whether the area size is larger than a size of the print information or not is executed (S1505).

If it is determined in step S1505 above that the area size is larger than the size of print information, furthermore a determination as to whether there is any change in the input information or not is executed (S1506), and if it is determined that there is no change, the input print information is stored in the RAM 1303 (S1507), and the system control shifts to the process c. On the other hand, if it is determined in step S1506 above that there is any change in the input information, the system control returns to step S1504 above, and input information is changed and inputted again.

If it is determined in step S1505 above that the area size is smaller than the size of input information (area size<size of input information), a warning indicating the necessity to change the size of input information is displayed (S1508), and furthermore a determination as to whether the size of print information should be changed (reduced) or not is executed (S1509). If it is determined in step S1509 above that the size of print information is changed (reduced) the print information is reduced (S1510), the system control returns to step S1507 above, and the reduced print information is stored in the RAM 1303.

On the contrary, if it is determined in step S1509 above that there is no need to change (reduce) the size of print information, a determination as to whether the contents of print information should be changed or the position of area should be changed is executed (S1511). In this step S1511, if it is determined that the contents of print information should be changed, the system control returns to step S1504 above, and the print information is changed and inputted again. On the contrary, if it is determined in step S1511 above that the position of area should be changed, the system control returns to the first step S1501, and an area is specified again. It should be noted that the change of the size of area is executed only when it can freely be changed by inputting coordinates or numerical values.

Figure 16:
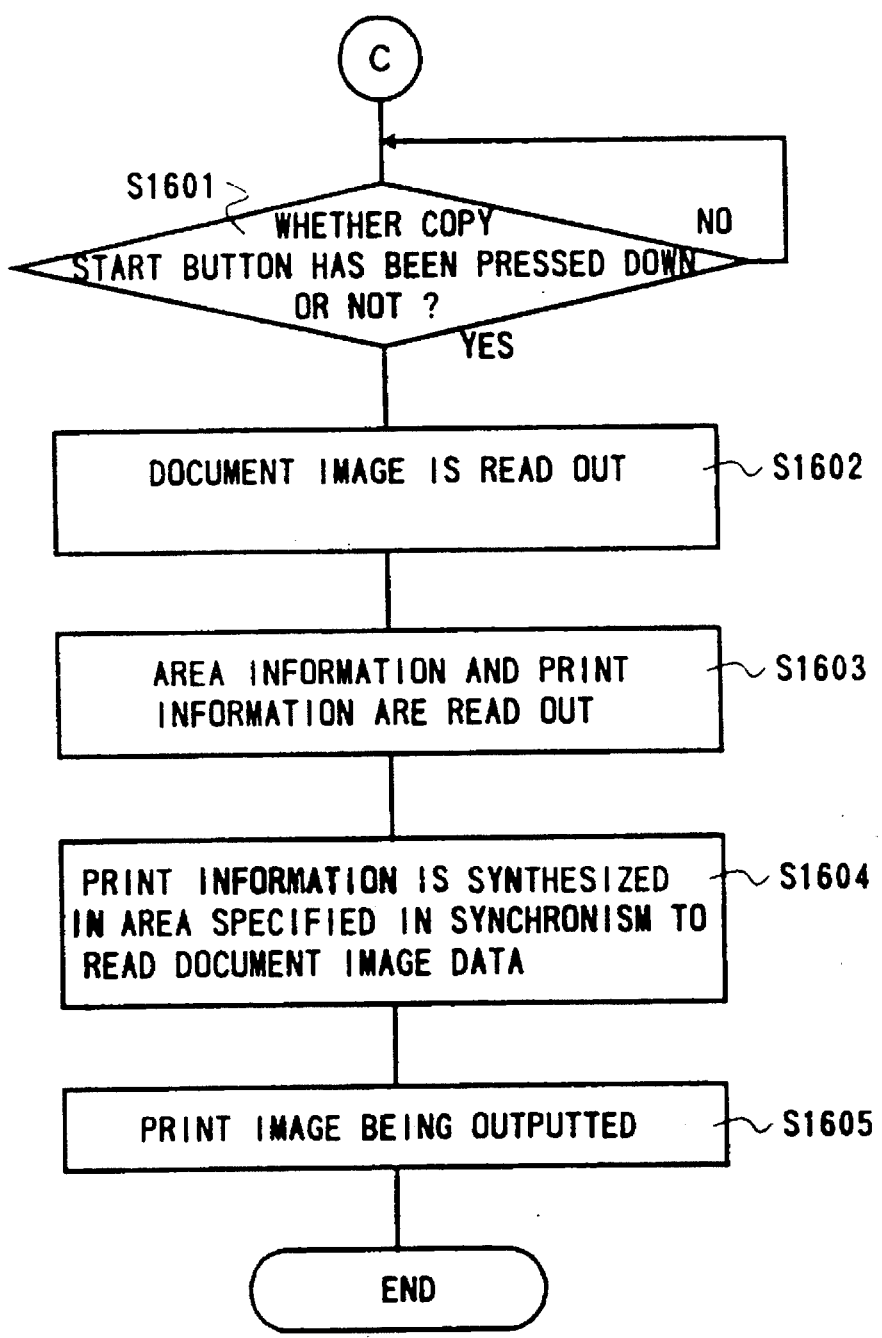
FIG. 16 is a flow chart illustrating operations for processing after areas and print information have been inputted or selected according to the present invention.
Figure 17:
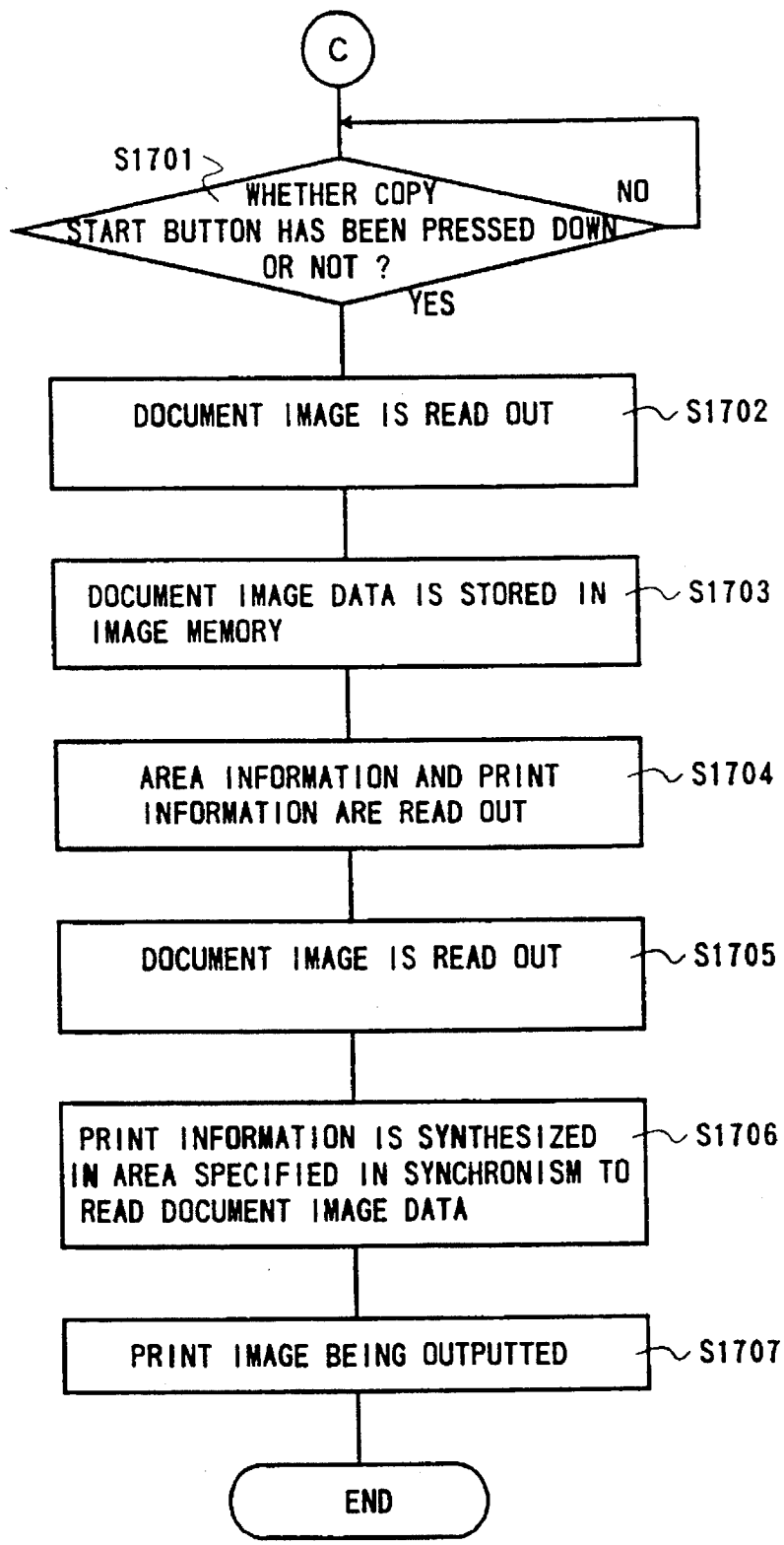
FIG. 17 is a flow chart illustrating operations for processing after areas and print information have been inputted or selected according to the present invention.

FIG. 16 and FIG. 17 are flow charts illustrating operations after the area above and the print information are inputted and fixed respectively, and the operations are executed in succession to the process C in step S1407 and step S1507 shown in FIG. 14 and FIG. 15 respectively. Also the difference between FIG. 16 and FIG. 17 is whether the image memory is used or not.

In FIG. 16, at first a determination as to whether the Copy Start button provided on the operating panel 200 has been pressed down or not is executed (S1601). If it is determined in step S1601 that the copy Start button has been pressed down, a document image read processing is executed by the image scanner 100 (S1602), as described above. Then, the specified area information and print information are read out from the RAM 1303 (S1603), and the print information is synthesized by the image synthesizing means 1304 in an area specified in synchronism to the read document image data (S1604). Then the synthesized image data is inputted into a control section of the laser writing unit 120, and the laser diode is modulated according to the image data, thus as described above the electrostatic latent image being formed on the photo-sensitive drum 130 and the print image being outputted (S1605).

In FIG. 17, at first a determination as to whether the Copy Start button provided on the operating panel 200 has been pressed down or not is executed (S1701). If it is determined in step S1701 above that the Copy Start button has been pressed down, the document image read processing is executed by the image scanner 100 (S1702), as described above. Then, the read document image data is stored in the image memory 1309 (S1703), the specified area information and print information are read out from the RAM 1303 (S1704), and furthermore the document image data is read out from the image memory 1309 (S1705). Then, the print information is synthesized by the image synthesizing means 1304 in an area specified in synchronism to the read document image data (S1706). Then the synthesized image data is inputted into a control section of the laser writing unit 120, the laser diode is modulated according to the image data, and the electrostatic latent image is formed on the photo-sensitive drum 130 with the print image outputted (S1707), as described above.

Next description is made for a processing method by making use of the image forming apparatuses according to the above embodiments in case where image data (black picture elements) exists on a document image in a section corresponding to the write area.

At first if image data (black picture elements) exists in a document image in a section corresponding to the write area, as the image data (black picture elements) in the write area is by its nature hid by a binding tool or the like and becomes invisible, namely as the image data there is practically not necessary, print information is processed preferentially, and the print information is printed in the section in preference to the image data in the section.

Secondly, because of the first reason described above, all the image data (black picture elements) of the document image in the section corresponding to the write area is converted to white picture elements, and the white picture elements are synthesized with the print information and outputted.

The processing method described above can easily be realized by using the control means 1301, image synthesizing means 1304, and image processing means 1305 all shown in FIG. 13.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus, comprising:

a document reading unit for reading data on a document and generating an image signal representing the document;

an optical writing unit for writing an optical signal corresponding to said image signal generated by said document reading unit onto a light-sensitive unit;

a punch hole specifying unit for specifying a number of punch holes for filing;

a print information inputting unit for inputting additional print information;

an area memory for storing a plurality of write areas onto which said additional print information inputted by said print information inputting unit may be written;

an area selecting unit for selecting one of said write areas between or adjacent to said punch holes according to an input signal from said punch hole specifying unit; and an image synthesizing unit for synthesizing said image signal read by said document reading unit with said additional print information inputted by said print information inputting unit to form a synthesized image in said write area selected by said write area selecting unit.

2. An image forming apparatus according to claim 1, wherein said area selecting unit selects said write area which is in a space between punch holes.

3. A method of forming an image comprising the steps of:

specifying a number of punch holes in a sheet of recording paper;

obtaining auxiliary image information which is to be printed on the sheet of recording paper;

obtaining main image data to be printed on the sheet of recording paper;

determining an area on the sheet of recording paper onto which the auxiliary information is to be printed between or adjacent to the punch holes which have been specified;

synthesizing the main image data with the auxiliary image data to form an image to be printed; and printing said image to be printed.

4. A method according to claim 3, wherein the step of determining the area onto which the auxiliary image information is to be printed references a memory which stores a plurality of areas which correspond to different punch holes.

5. A method according to claim 3, wherein:

the step of determining the area onto which the auxiliary image information is to be printed determines an area between the punch holes.

6. A method according to claim 4, wherein:

the step of determining the area onto which the auxiliary image information is to be printed determines an area between the punch holes.

7. An apparatus for forming an image, comprising:

a device for specifying a number of punch holes in a sheet of recording paper;

a device which specifies auxiliary image information which is to be printed on the sheet of recording paper;

a scanner for obtaining main image data to be printed on the sheet of recording paper;

a device for determining an area on the sheet of recording paper onto which the auxiliary image information is to be printed between or adjacent to the punch holes which have been specified:

a synthesizing unit for synthesizing the main image data with the auxiliary image data to form an image to be printed; and a printer for printing said image to be printed.

8. An apparatus according to claim 7, wherein the device for determining the area onto which the auxiliary image information is to be printed references a memory which stores a plurality of areas which correspond to different punch holes.

9. An apparatus according to claim 7, wherein:

the device for determining the area onto which the auxiliary image information is to be printed determines an area between the punch holes.

10. An apparatus according to claim 8, wherein:

the device for determining the area onto which the auxiliary image information is to be printed determines an area between the punch holes.

* * * * *